Patented July 16, 1940

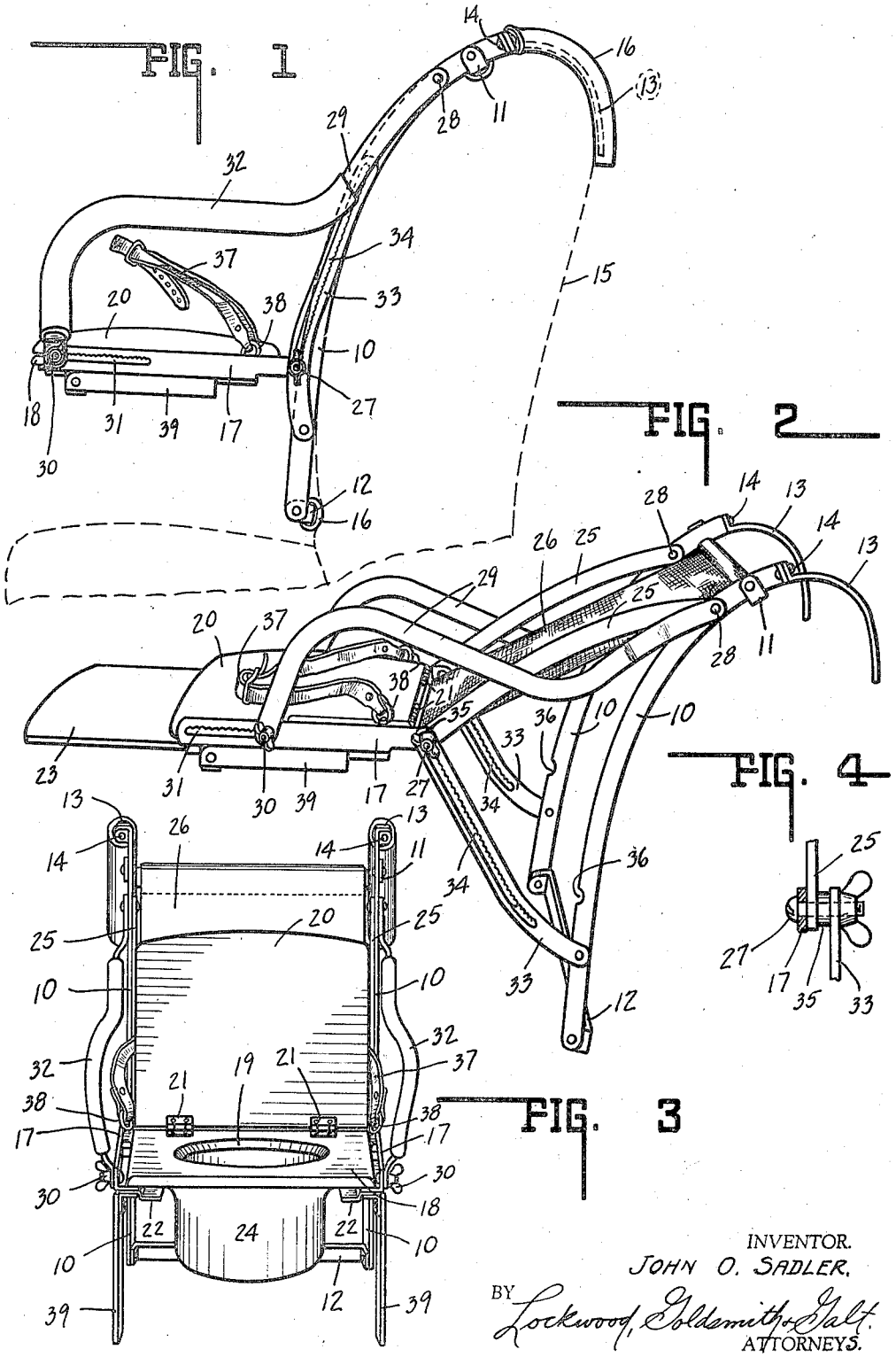
COMBINED SEAT AND BED FOR INFANTS
Filed Nov. 17, 1938
INVENTOR.
JOHN O. SADLER.
BY Lockwood, Goldsmith & Galt
ATTORNEYS.

2,208,392

UNITED STATES PATENT OFFICE 2,208,392

COMBINED SEAT AND BED FOR INFANTS

John O. Sadler, Indianapolis, Ind.

Application November 17, 1938, Serial No. 240,914

5 Claims. (Cl. 155—79)

This invention relates to a combined seat and bed for infants particularly adapted for automobile travel.

The care and safeguarding of a child of the age of three years or less in long distance automobile travel without special equipment is a difficult undertaking. It involves constant attention during periods of wakefulness when the child's intense interest in everything which takes place within sight or hearing makes it necessary for him to stand erect on a seat in a dangerous position or be held in the arms in order to see what goes on outside the vehicle. It also requires holding the child for long periods when the inevitable drowsiness overtakes him. The meeting of his toilet requirements whenever and wherever they occur is an additional problem often difficult of solution.

One object of the invention is to provide a device adapted to relieve parents of much of the most fatiguing part of the care of infants under such conditions with complete safety to the infant.

Another object of the invention is to provide a combined seat and bed for small children which may be conveniently and securely attached to the front or back seat of an automobile and which may be adjusted so that the child may sit erect in position to see clearly through the side windows or windshield and which may also be adjusted so that he may assume a reclining position when sleep becomes necessary.

Another object of the invention is to provide a device which may be adjusted from the erect to the reclining position without disturbing a child who may have fallen asleep while sitting up.

Another object of the invention is to provide the necessary toilet facilities for a child and to provide said facilities in such manner that they may be used either in the vehicle or elsewhere.

For the accomplishment of these and other objects, the invention provides a device which may be supported on the back of a vehicle seat and which includes a seat structure and a back structure which may be adjusted as a chair with the seat structure substantially horizontal and the back structure approaching the vertical or may be adjusted as a bed with both structures approaching the horizontal. The arrangement of parts is such that the conversion from one adjustment to another or to an intermediate adjustment may be made without disturbing the infant. The seat structure is provided with a hinged upper seat normally covering a lower seat provided with a toilet opening beneath which a toilet receptacle may be placed.

Other objects and features of the invention will be understood from the following specification and claims and the accompanying drawing.

Fig. 1 is a side view of the device supported by the back of a vehicle seat and adjusted as a chair in which a child may sit erect. Fig. 2 is a perspective view of the device adjusted as a bed. Fig. 3 is a perspective view of the device arranged for toilet use. Fig. 4 is a fragmentary detail in elevation with a part in section.

In the preferred form of the invention shown in the drawing by way of illustration, there is provided a main frame consisting of side bars 10, cross members 11 and 12 and curved portions 13. The bars 10 and cross members 11 and 12 are secured together in a rigid structure and the curved members 13 are pivotally secured by means of bolts or rivets 14 to the upper ends of the members 10. The main frame is shaped to fit the back of a vehicle seat 15 as shown in Fig. 1 with the curved portions 13 extending over the seat back and supporting the frame thereon. Preferably the cross member 12 and the curved members 13 are provided with a covering 16 in the form of flexible rubber tubing or other suitable material for protecting the vehicle seat against wear. The covering 16 is shown in Fig. 1 but is omitted from Fig. 2 for the sake of clarity.

The device is provided with a seat structure consisting of a pair of angle side members 17 having permanently secured thereto a seat 18 provided with a toilet opening 19 and visible only in Fig. 3 of the drawing. An upper seat 20, preferably having a cushioned construction, is fastened to the seat 18 by hinges 21 and normally covers the seat 18 as shown in Figs. 1 and 2. The seat structure is provided with a pair of guideways 22 secured beneath the side members 17 and carrying an extension piece 23 normally retained beneath the seat 18 but movable to the position shown in Fig. 2 for extending the length of said seat. For use as a toilet, the extension piece 23 may be removed and a flanged toilet receptacle 24 may be placed in position beneath the opening 19 and supported on the guideways 22.

A back structure serving as a seat back in the erect position and as a part of the bed in the reclining position is also provided. Said back structure in the preferred form of the invention consists of a pair of link members 25 and a back member 26 preferably of fabric. The links 25 are pivotally connected at their lower ends to the side members 17 of the seat structure by wing bolts 27 and are pivotally connected at their upper ends by rivets 28 to the side members 10 of the main frame adjacent the upper ends of said side members. The fabric back member 26 is secured at its upper end to the cross member 11 of the main frame and at its lower end to the underside of the seat structure. The links 25 maintain the proper spacing between the ends of the back member 26 in the adjustment of the device and thus said links and said back member together perform the functions of a chair back and may be considered as parts of a single back structure. If desired the member 26 may be supported directly by the links 25 since it moves with said links in the adjustment of the device. A cushioned member similar to the seat 20 may be substituted for the fabric member 26 or detached cushions or blankets may be placed thereon as found necessary.

A pair of side members 29 are pivotally secured at their upper ends by means of the rivets 28 to the upper ends of the links 25 and to the frame members 10. The opposite ends of said members 29 are adjustably secured to the side members 17 of the seat structure by means of wing bolts 30 engaging slotted openings 31 in said side members 17. Said members 29 are preferably covered with rubber tubing 32 as shown in Fig. 1.

A pair of links 33 are pivotally connected at their lower ends to the lower portions of the side members 10 of the main frame. Said links are provided with slotted openings 34 engaging the wing bolts 27.

In the use of the device as a seat in which a child may sit erect, the wing bolts 27 are placed in the lowermost portion of the slotted opening 34 and the wing bolts 30 are placed at the extreme outer ends of the slotted openings 31 as shown in Fig. 1. In this position, the seat structure is substantially horizontal and the back structure consisting of the links 25 and the back member 26 approaches the vertical. A pair of spacing collars 35 (Fig. 4) carried by the wing bolts 27 engage notches 36 formed in the side members 10 of the main frame and form a firm seat for the rear of the seat structure. A child may be seated on the seat structure and may be held firmly and safely in place by a strap 37 secured to eyes 38 in turn secured to the seat structure. In this position the child may travel with all the safety and comfort that he may enjoy in his high chair at home and is seated sufficiently above the vehicle seat to provide an unobstructed view of events outside the car. I have found that young children will ride contentedly in this position for long periods with a minimum of attention from their elders.

If the child needs sleep, the device may be adjusted to the bed position of Fig. 2 without disturbing him. This is accomplished by manually supporting the seat structure while the wing bolts 27 and 30 are loosened and the seat structure is raised to the Fig. 2 position. The wing bolts 30 in this movement are automatically moved to the rear of the slotted openings 31 and at the same time the wing bolts 27 are raised to the upper end of the slotted opening 34. When said bolts are tightened in this position, the seat structure and the back structure approach the horizontal and are firmly supported in that position by the link members 33 and the side members 29. For the child's comfort, the extension member 23 may be moved forward as a support for his feet. The strap 37 and side members 29 prevent the child from falling in this position as well as in the erect position.

In the use of the device for toilet purposes, the receptacle 24 may be put in position and the seat 20 lifted. This may be done while the device is still in position in the automobile or, if it is more convenient, the device may be set on the ground in any convenient location. This is accomplished by turning downwardly a pair of legs 39 which are pivotally mounted adjacent the front edge of the seat structure and which are normally carried in the position shown in Figs. 1 and 2. The legs 39 extend downwardly approximately to the level of the lower end of the main frame and thus serve with said main frame as an adequate support.

For shipment or for carrying, the wing bolts 27 are placed in the position of Fig. 1, the wing bolts 30 are loosened and the seat structure is folded downwardly substantially in alignment with the main frame. The curved members 13 are turned inwardly about their pivot bolts 14. The entire device is thus compactly folded and may be packed or stored in a very small space.

From the foregoing specification it will be apparent that the invention provides a device which greatly aids in the care of young children in automobile travel. It is equally useful when the child is wakeful or when he is sleeping and the change from one use to the other is made with a minimum of difficulty. The construction is rugged and sturdy and there are no parts apt to need frequent replacement.

In the drawing and specification a preferred form of the invention has been disclosed. Obviously the details thereof may be varied within wide limits without departing from the scope of the invention as defined in the appended claims.

The invention claimed is:

1. In a device of the class described, a main frame adapted to rest against the back of a vehicle seat and having a portion shaped to engage the top of said seat back for supporting said frame thereon, a back structure having its upper portion pivotally connected to said main frame adjacent the upper end thereof, a seat structure pivotally connected to said back structure adjacent the lower end thereof, adjustable supporting means supported by said back structure and adapted to support said seat structure in variable angular relationship to said back structure, and adjustable supporting means supported by said main frame and adapted to support both of said structures in variable angular relationship to said main frame, whereby said device may be adjusted as a seat with said seat structure substantially horizontal and said back structure approaching the vertical or as a bed with both of said structures approaching the horizontal.

2. A device as defined by claim 1 in which the main frame extends below the level of said seat structure, and with the addition of supporting structure, and with the addition of supporting means attached to the seat structure adjacent the forward edge thereof and extending downwardly substantially to the level of the lower part of said main frame, said supporting means serving with said main frame to support said device when adjusted as a chair and placed upon the ground.

3. A device as defined by claim 1 in which the main frame extends below the level of said seat structure, and with the addition of supporting means attached to the seat structure adjacent the forward edge thereof and extending downwardly substantially to the level of the lower part of said main frame, said supporting means serving with said main frame to support said device when adjusted as a chair and placed upon the ground, said supporting means being pivotally attached to said seat structure and movable to a substantially horizontal position when not in use.

4. A device as defined by claim 1 in which the seat structure is provided with a hinged upper seat, and a lower seat having a toilet opening therein and in which the main frame extends below the level of said seat structure, and with the addition of supporting means attached to the seat structure adjacent the forward edge thereof and extending downwardly substantially to the level of the lower part of said main frame, said supporting means serving with said main frame to support said device when adjusted as a chair and placed upon the ground.

5. In a device of the class described, a main frame adapted to rest against the back of a vehicle seat and having a portion shaped to engage the top of said seat back for supporting said frame thereon, a seat structure, link members pivotally attached at one end to said main frame adjacent the upper end thereof and pivotally attached at their opposite ends to the rear of said seat structure, a back member arranged between said link members and supported adjacent the ends thereof, link members pivotally secured adjacent the upper ends of said first mentioned link members and adjustably secured adjacent the forward portion of said seat structure for supporting the same in variable angular relationship to said first mentioned link members, and other link members pivotally secured to said main frame adjacent the lower part thereof and adjustably secured adjacent the pivot point of said seat structure and said first mentioned link members to support the same in variable angular relationship to said main frame.

JOHN O. SADLER.